United States Patent
Yamada

(10) Patent No.: US 10,730,126 B2
(45) Date of Patent: Aug. 4, 2020

(54) POWER SUPPLY DEVICE FOR WIRE ELECTRIC DISCHARGE MACHINING

(71) Applicant: SODICK CO., LTD., Kanagawa (JP)

(72) Inventor: Kuniharu Yamada, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 629 days.

(21) Appl. No.: 14/428,370

(22) PCT Filed: Sep. 18, 2013

(86) PCT No.: PCT/JP2013/075208
§ 371 (c)(1),
(2) Date: Mar. 16, 2015

(87) PCT Pub. No.: WO2014/046149
PCT Pub. Date: Mar. 27, 2014

(65) Prior Publication Data
US 2015/0246403 A1 Sep. 3, 2015

(30) Foreign Application Priority Data

Sep. 18, 2012 (JP) ................... 2012-203828

(51) Int. Cl.
*B23H 7/04* (2006.01)
*B23H 7/14* (2006.01)
*B23H 1/02* (2006.01)

(52) U.S. Cl.
CPC ............ *B23H 7/04* (2013.01); *B23H 7/14* (2013.01); *B23H 1/02* (2013.01); *B23H 1/022* (2013.01)

(58) Field of Classification Search
CPC ............. B23H 1/02; B23H 1/022; B23H 7/04
(Continued)

(56) References Cited

U.S. PATENT DOCUMENTS 3,390,246 A * 6/1968 Webb ............... B23H 1/022
219/69.18
3,755,645 A * 8/1973 Kauffman ............. B23H 7/18
219/69.13
(Continued)

FOREIGN PATENT DOCUMENTS

JP S44-010595 5/1969
JP H05-008121 1/1993
(Continued)

OTHER PUBLICATIONS

"International Search Report (Form PCT/ISA/210)", dated Oct. 15, 2013, with English translation thereof, pp. 1-2.

*Primary Examiner* — Tu B Hoang
*Assistant Examiner* — Masahiko Muranami
(74) *Attorney, Agent, or Firm* — JCIPRNET

(57) ABSTRACT

A power supply device for wire electric discharge machining includes: a first DC power supply; first switching elements between the first DC power supply and a machining gap; a second DC power supply; a second switching element between the second DC power supply and the machining gap; and a pulse generator controlling the first and second switching elements. The pulse generator is configured so that, in order to generate an electric discharge in the machining gap, the second switching element is switched on and the voltage of the second DC power supply is applied to the machining gap; the first switching element is switched on intermittently at a predetermined frequency in response to an electric discharge generation detection signal, and a series of current pulses is fed to the machining gap. The feeding of the series of current pulses is discontinued when the current pulses don't reach a reference current.

9 Claims, 2 Drawing Sheets

(58) Field of Classification Search
USPC .............................. 219/69.12, 69.13, 69.18
See application file for complete search history.

(56) References Cited

U.S. PATENT DOCUMENTS

| | | | | |
|---|---|---|---|---|
| 3,988,560 | A * | 10/1976 | Losey | B23H 1/024 219/69.13 |
| 4,236,057 | A * | 11/1980 | Inoue | B23H 1/024 219/69.13 |
| 4,798,929 | A * | 1/1989 | Itoh | B23H 1/024 219/69.12 |
| 4,892,989 | A * | 1/1990 | Itoh | B23H 1/024 219/69.13 |
| 5,539,178 | A * | 7/1996 | Taneda | B23H 1/022 219/69.13 |
| 6,281,463 | B1 * | 8/2001 | Kaneko | B23H 1/022 219/69.13 |
| 2004/0193306 | A1 * | 9/2004 | Kurihara | B23H 7/20 700/162 |
| 2007/0163999 | A1 * | 7/2007 | Jaques | B23H 7/04 219/69.12 |

FOREIGN PATENT DOCUMENTS

| | | |
|---|---|---|
| JP | H08-118147 | 5/1996 |
| JP | 11-267926 | 10/1999 |
| JP | 11-347844 | 12/1999 |
| JP | 2007-196340 | 8/2007 |
| JP | 4850318 | 1/2012 |
| WO | 01-032342 | 5/2001 |
| WO | 2002/058874 | 8/2002 |

\* cited by examiner

POWER SUPPLY DEVICE FOR WIRE ELECTRIC DISCHARGE MACHINING

CROSS-REFERENCE TO RELATED APPLICATION

This application is a 371 application of an international PCT application serial no. PCT/JP2013/075208, filed on Sep. 18, 2013, which claims the priority benefit of Japan application no. 2012-203828, filed on Sep. 18, 2012. The entirety of each of the above-mentioned patent applications is hereby incorporated by reference herein and made a part of this specification.

BACKGROUND OF THE INVENTION

Field of the Invention

The invention relates to a wire electric discharge machining device that intermittently generates an electric discharge in a machining gap formed between a wire electrode and a work piece to machine the work piece. In particular, the invention relates to a power supply device that repeatedly supplies current pulses to the machining gap through control of a switching element.

Description of Related Art

It is known that a capacitor-type power supply device generates an electric discharge in the machining gap by discharging a capacitor. The capacitor is connected in parallel to the machining gap. The capacitor-type power supply device is capable of supplying a current pulse that has a relatively steep rise. However, the supply of the current pulse depends on the charging and discharging of the capacitor. For this reason, the waveform of the current pulse is irregular and the surface roughness becomes non-uniform. In addition, for the capacitor-type power supply device, a relatively long off time is required in order to recover the insulation of the machining gap. Since there is a limit on the shortening of the rising time of the current pulse, it is difficult to increase the machining speed.

On the other hand, a non-capacitor-type power supply device does not include the capacitor and supplies the current pulse to the machining gap by controlling a switching element that is connected with the machining gap in series. Because the pulse width and the current peak of the current pulse can be easily controlled, the sizes of the crater-like holes formed by the current pulse are uniform. As a result, the surface roughness decreases, which is preferable.

In general wire electric discharge machining, multiple processes are carried out with different machining conditions in order to fabricate one product. First, a desired contour is roughly formed on the work piece. Then, in order that the dimensions of the contour meet the required values, the excess material is removed from the cut surface with high precision. Finally, finishing for improving the roughness of the cut surface is performed. As the processes come close to finishing, a current pulse of less energy is used. In the process before the finishing, most non-capacitor-type power supply devices supply a trapezoidal current pulse that has a constant pulse width to the machining gap. Such a current pulse improves the machining speed. However, since it cannot improve the surface roughness, the time required for finishing increases.

It is known that, if the current pulse is supplied to the machining gap at a high frequency of 1 MHz or more, the surface roughness is improved. Patent Literature 1 discloses supplying a current pulse to the machining gap at a high frequency by applying an AC voltage.

PRIOR ART LITERATURE

Patent Literature

[Patent Literature 1] International Publication No. 2002-58874

SUMMARY OF THE INVENTION

Problem to be Solved

The holes formed on the cut surface by such a current pulse are fine but non-uniform, which is unfavorable. An object of the invention is to improve the surface roughness without sacrificing the machining speed in the process before the finishing. Other objects or advantages of the invention are set forth in the following descriptions.

Solution to the Problem

The invention relates to a power supply device for wire electric discharge machining, which includes a first DC power supply (11);
first switching elements (12, 18) disposed between the first DC power supply and a machining gap (7);
a second DC power supply (21);
a second switching element (22) disposed between the second DC power supply and the machining gap;
an electric discharge generation detector (42) generating a detection signal (St) indicating that an electric discharge is generated in the machining gag; and
a pulse generator (40) controlling the first switching elements and the second switching element.

The pulse generator switches on the second switching element and applies a voltage of the second DC power supply to the machining gap in order to generate the electric discharge in the machining gap, intermittently switches on the first switching elements at a predetermined frequency in response to the detection signal of the electric discharge generation detector and supplies a series of current pulses to the machining gap, and discontinues supply of the series of current pulses when the current pulses do not reach a reference current (Ir).

It is preferable that a circuit where a current flows from the first DC power supply to the machining gap through the first switching elements does not comprise a current limiting resistor. The predetermined frequency may be 1 MHz or more.

DESCRIPTION OF THE EMBODIMENTS

Figure 1:
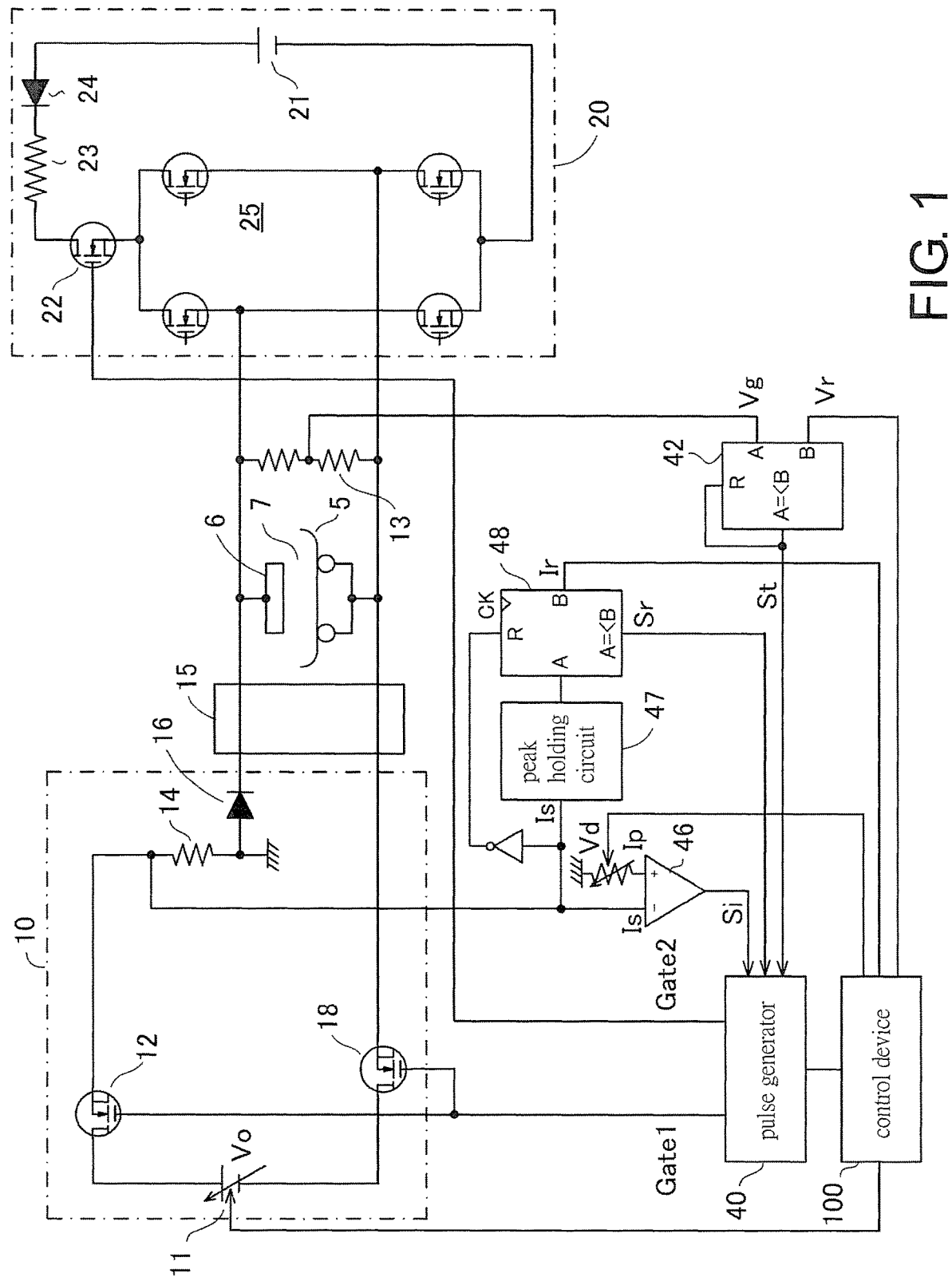
FIG. 1 is a block diagram showing the power supply device of the invention.

An embodiment of a power supply device for wire electric discharge machining of the invention is described with reference to FIG. 1. The power supply device of FIG. 1 is suitable for a process before finishing. The power supply device includes a main power supply circuit 10 and an auxiliary power supply circuit 20. A machining gap 7 is formed between a wire electrode 5 and a work piece 6. The main power supply circuit 10 supplies a main discharge current for machining when an electric discharge is generated in the machining gap 7 and the discharge current starts to flow. A resistance and an inductance in the main power supply circuit 10 are made as small as possible. The auxiliary power supply circuit 20 applies a voltage for inducing the electric discharge in the machining gap 7. In a case where the main power supply circuit 10 has the function of the auxiliary power supply circuit 20, the auxiliary power supply circuit 20 may be omitted.

The main power supply circuit 10 includes a first DC power supply 11, first switching elements 12 and 18, a detection resistor 13, and a detection resistor 14. The first switching elements 12 and 18 are disposed for controlling the current flowing to the machining gap 7. An output voltage of the first DC power supply 11 is variable. The first switching element 12 is disposed between a positive electrode of the first DC power supply 11 and the machining gap 7. The first switching element 18 is disposed between a negative electrode of the first DC power supply 11 and the machining gap 7. The detection resistor 13 is connected to the first DC power supply 11 in parallel to the machining gap 7. The detection resistor 14 is disposed in series between the machining gap 7 and the first switching element 12. Inevitably, the main power supply circuit 10 is physically separated from the machining gap 7. A low inductance line 15 connects the main power supply circuit 10 and the machining gap 7. The main power supply circuit 10 further includes a reverse flow blocking diode 16 that is disposed between the detection resistor 14 and the low inductance line 15.

The first DC power supply 11 generates a DC voltage of 15V to 450V. The first switching element 12 is a MOSFET that has superior rising and withstand voltage characteristics. The low inductance line 15 is a coaxial cable. The reverse flow blocking diode 16 prevents the current from flowing back to the first DC power supply 11 due to a reverse voltage generated in the machining gap 7. The main power supply circuit 10 does not include a current limiting resistor, except for the resistor in the machining gap 7 and the detection resistor 14 that has a small resistance value. Thus, the main power supply circuit 10 includes no substantial resistance element, and current loss is reduced. As a result, the main power supply circuit 10 can provide a current pulse having a higher peak at a high frequency. Moreover, the main power supply circuit 10 includes no coil or inductance element and is connected to the machining gap 7 via the low inductance line 15. Therefore, with the main power supply circuit 10, it is possible to provide a current pulse that has a steeper rising edge. Consequently, the main power supply circuit 10 can provide a high-frequency current pulse.

The auxiliary power supply circuit 20 includes a second DC power supply 21, a second switching element 22, a current limiting resistor 23, a reverse flow blocking diode 24, and a polarity switching circuit 25. The second DC power supply 21 is connected in parallel to the first DC power supply 11. The second switching element 22 is disposed between the second DC power supply 21 and the machining gap 7 for controlling the voltage applied to the machining gap 7. The current limiting resistor 23 is connected in series to the second switching element 22 between the machining gap 7 and the second DC power supply 21. The reverse flow blocking diode 24 is connected in series to the second DC power supply 21. The polarity switching circuit 25 is disposed between the second DC power supply 21 and the second switching element 22 and is composed of a bridge circuit of switching elements.

The second DC power supply 21 generates a DC voltage of 80V. The second switching element 22 is a MOSFET. The reverse flow blocking diode 24 prevents an inrush current from flowing back to the second DC power supply 21. The polarity switching circuit 25 switches a polarity of the DC voltage of the second DC power supply 21 between the positive polarity and the reverse polarity. The positive polarity is that the wire electrode is negative and the work piece is positive. The reverse polarity is that the wire electrode is positive and the work piece is negative.

A voltage Vg (gap voltage) of the machining gap 7 is detected by using the detection resistor 13. The gap voltage Vg is supplied to an input terminal A of a digital comparator 42. A control device 100 supplies a reference voltage Vr to an input terminal B of the digital comparator 42. The reference voltage Vr is set to a value that is slightly smaller than an output voltage of the second DC power supply 21. For example, if the output voltage of the second DC power supply 21 is 90V, the reference voltage is 87V. The control device 100 can change the reference voltage Vr. The digital comparator 42 compares the gap voltage Vg with the reference voltage Vr and constitutes an electric discharge generation detector. When the gap voltage Vg drops to or below the reference voltage Vr, the digital comparator 42 outputs an impulse signal St indicating that the electric discharge is generated in the machining gap 7. St is called "electric discharge generation detection signal" hereinafter.

A detection voltage across two terminals of the detection resistor 14 indicates a current Is (gap current) flowing to the machining gap 7 and is supplied to one input terminal (−) of a differential amplifier 46. A variable resistor is connected to the other input terminal (+) of the differential amplifier 46 and a reference voltage Vd is supplied to the other input terminal of the differential amplifier 46. The control device 100 can change the reference voltage Vd according to a switching signal. The reference voltage Vd indicates a setting value of a current peak Ip. The current peak is one of the machining conditions and indicates a peak value of the current pulse. When the gap current Is is equal to or lower than the setting value of the current peak Ip, the differential amplifier 46 supplies a second reference signal Si to the pulse generator 40.

The detection voltage indicating the gap current Is is also supplied to a peak holding circuit 47. The peak holding circuit 47 maintains a maximum value of the detection voltage in a predetermined period, wherein the detection voltage indicates the gap current Is. The peak holding circuit 47 continuously supplies a rectangular waveform indicating the maximum voltage to the input terminal A of a digital comparator 48 in every predetermined period. Therefore, the peak holding circuit 47 functions as an AD converter that converts an analog signal to a digital signal. The control device 100 supplies a voltage indicating a first reference current Ir to the input terminal B of the digital comparator 48. The first reference current Ir is lower than the setting value of the current peak Ip. Since non-uniform current pulses are unfavorable for surface roughness, it is preferred that the first reference current Ir is higher than ½ of the setting value Ip. The digital comparator 48 compares the gap current Is with the first reference current Ir in every predetermined period. When the gap current Is is lower than the first reference current Ir, the digital comparator 48 generates a first reference signal Sr.

The control device 100 provides a machining condition including an off time OFF to the pulse generator 40. The pulse generator 40 supplies a first gate signal Gate1 to the first switching elements 12 and 18 and supplies a second gate signal Gate2 to the second switching element 22. The first switching elements 12 and 18 are on only when the first gate signal Gate1 is generated. The second switching element 22 is on only when the second gate signal Gate2 is generated. When the first gate signal Gate1 is off and the first switching elements 12 and 18 are switched off, the main power supply circuit 10 is substantially cut off from the machining gap 7. As a result, the current pulse falls steeply and thus it is preferable.

When receiving the second reference signal Si, the pulse generator 40 does not supply the first gate signal Gate1 and the second gate signal Gate2 to the switching elements 12, 18, and 22. In other words, if the gap current Is exceeds the setting value of the current peak Ip, the pulse generator 40 switches off the switching elements 12, 18, and 22 and limits the gap current Is to the current peak Ip which is the upper limit value.

Figure 2:
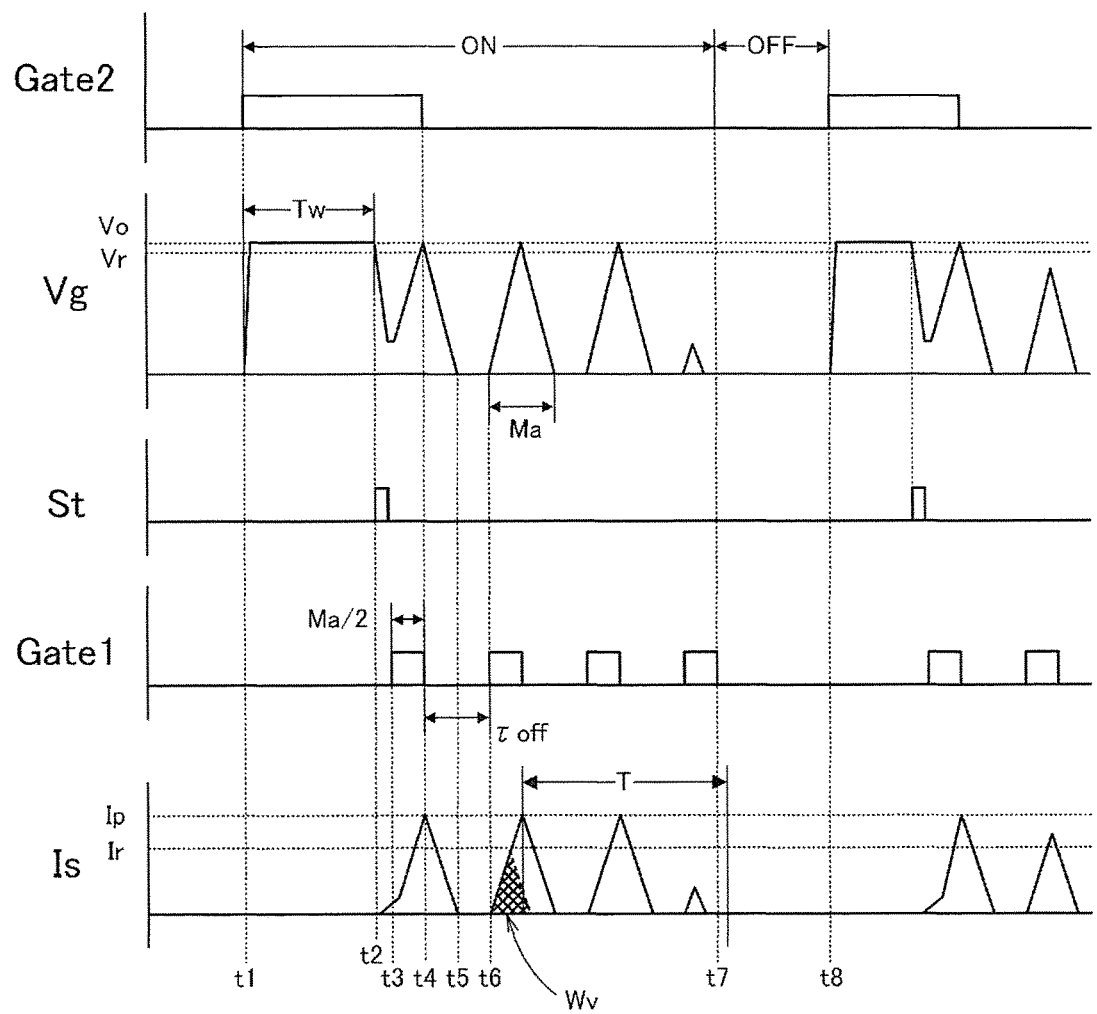
FIG. 2 is a timing chart showing an operation of the pulse generator of FIG. 1.

An operation of the pulse generator 40 is explained with reference to FIG. 2. FIG. 2 shows the second gate signal Gate2, the gap voltage Vg, the electric discharge generation detection signal St, the first gate signal Gate1, and the gap current Is. The operator sets the machining condition to the control device 100. A setting value of the machining condition is stored in a memory device of the control device 100. The machining condition includes the off time OFF, a frequency Mo, a pulse width Ma, the voltage Vo, and the current peak Ip, for example. The frequency Mo is 1 MHz or more.

Prior to the machining, the control device 100 provides the off time OFF, the frequency Mo, and the pulse width Ma to the pulse generator 40. The control device 100 supplies the switching signal to the first DC power supply 11 and sets the output voltage of the first DC power supply 11 to the voltage Vo. The control device 100 supplies the reference voltage Vr to the input terminal B of the digital comparator 42. The control device 100 supplies the switching signal to the variable resistor and the reference voltage Vd indicating the setting value of the current peak Ip is supplied to the other input terminal of the differential amplifier 46. In addition, the control device 100 supplies the voltage indicating the first reference current Ir to the input terminal B of the digital comparator 48.

The pulse generator 40 generates the second gate signal Gate2 at a time t1 when the off time OFF has passed. As a result, the second switching element 22 is switched on, and the DC voltage for inducing the electric discharge is applied to the machining gap 7 from the second DC power supply 21. The gap voltage Vg rises steeply to a no-load voltage Vo. The no-load voltage Vo is maintained until the electric discharge is generated in the machining gap 7. When the electric discharge is generated in the machining gap 7 at a time t2 when a waiting time Tw has passed from the time t1, the gap current Is starts to flow to the machining gap 7 and the gap voltage Vg drops rapidly. The waiting time Tw in which the gap current Is does not flow is a time that is difficult to predict. Since the current limiting resistor 23 of the auxiliary power supply circuit 20 is sufficiently large, the gap current Is during generation of the electric discharge increases gradually.

When the gap voltage Vg drops to or below the reference voltage Vr, the digital comparator 42 supplies the impulse signal St indicating generation of the electric discharge to the pulse generator 40. The digital comparator 42 is reset according to the impulse signal St. The pulse generator 40 intermittently generates the first gate signal Gate1 at a predetermined discharge frequency in response to the impulse signal St and supplies a series of current pulses to the machining gap 7. At a time t3 when a little delay time has passed from the time t2, the pulse generator 40 generates the first gate signal Gate1. As a result, the first switching elements 12 and 18 are switched on and a large current is supplied to the machining gap 7 from the first DC power supply 11. Meanwhile, because the second gate signal Gate2 is maintained in an on state, the gap current Is rises steeply to the current peak Ip.

At a time t4 when a predetermined time has passed from the time t3, the pulse generator 40 switches off the first gate signal Gate1 and the second gate signal Gate2. Based on the pulse width Ma, for example, the predetermined time is half of the pulse width Ma. The gap voltage Vg drops rapidly and becomes 0 at a time t5. The gap current Is also falls rapidly from the current peak Ip and extinguishes at the time t5.

Figure 3:
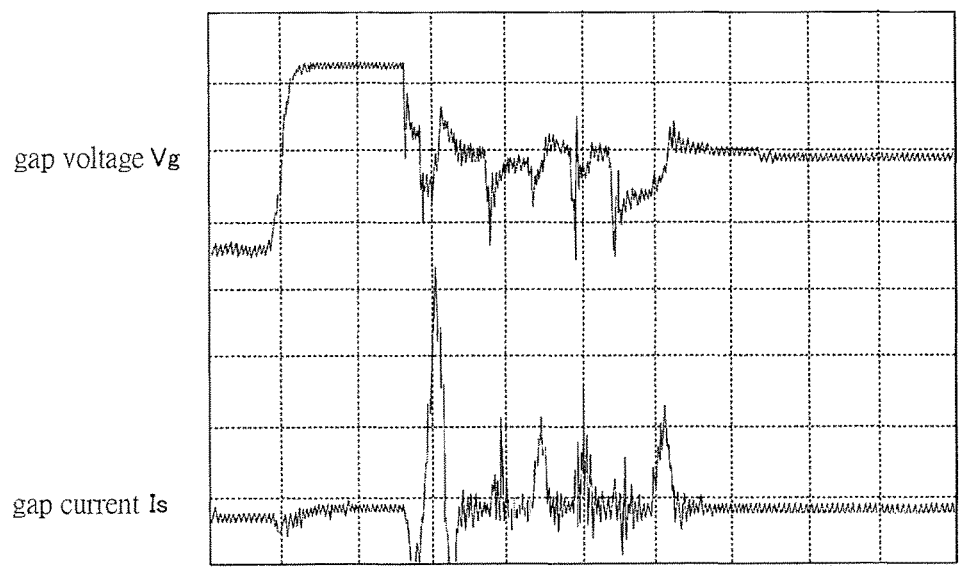
FIG. 3 is a diagram showing the actual gap voltage and gap current.

If the gap current Is rises and exceeds the setting value of the current peak Ip, the differential amplifier 46 stops the supply of the second reference signal Si. As a result, the pulse generator 40 switches off all the switching elements 12, 18, and 22 and limits the gap current Is. In that case, the waveform of the current pulse is trapezoidal rather than triangular. However, it is intended that the current peak supplies a high current pulse at a high frequency of 1 MHz or more, and the machining condition is set for that purpose. In reality, the gap current Is seldom reaches the current peak Ip during the period of the pulse width Ma. The power supply device of the invention continuously supplies the current pulses that are sharp triangular waves, as shown in FIG. 3.

At a time t6 when a pause width τoff has passed from the time t4, the pulse generator 40 generates the first gate signal Gate1 again. At the time t6, the gap voltage Vg rises steeply and the gap current Is rises without the waiting time. The pause width τoff is a time decided by the frequency Mo and the pulse width Ma. The pause width τoff is much shorter than the off time OFF for recovering the insulation of the machining gap 7. The pulse generator 40 repeatedly generates the first gate signal Gate1 at a high frequency of 1 MHz or more according to the frequency Mo and the pulse width Ma.

The current pulse decays as time passes. If the current pulse does not reach the first reference current Ir during the period of the pulse width Ma, the pulse generator 40 stops the supply of a series of current pulses and starts counting the off time OFF. In FIG. 2, the pulse generator 40 switches off the first gate signal Gate1 at a time t7. At a time t8 when the off time OFF has passed from the time t7, the pulse generator 40 generates the second gate signal Gate2 again.

On the one hand, the power supply device of the invention supplies the current pulse with a small pulse width to the machining gap 7, and therefore the crater-like holes formed on the surface of the work piece by one shot of the current pulse are small and the surface roughness does not increase. Consequently, the time required for finishing is shortened. On the other hand, with the power supply device of the invention, the current peak can generate the high current pulse at a high frequency of 1 MHz or more, and thus the machining efficiency is not sacrificed.

In addition, it is also possible to set the predetermined time T. For example, a current pulse Wv indicated by the hatching in FIG. 2 does not reach the first reference current Ir during the generation of the first gate signal Gate1. However, immediately after the current pulse Wv, a current pulse that reaches the first reference current Ir may be generated. Accordingly, whether the current pulse that reaches the first reference current Ir is generated during the predetermined time T is determined. As a result, the off time OFF is shortened, and decrease of the machining speed is suppressed.

The power supply device of the invention can reduce the surface roughness without sacrificing the machining speed in the process before the finishing. Traditionally, in the process before the finishing, the surface roughness decreases to 18 μmRz at the machining speed of 3.5 mm/min. The power supply device of the invention, set with the same current peak as the traditional machining, reduces the surface roughness to 8 μmRz at the machining speed of 4.5 mm/min.

The power supply device of the invention should not be construed as limited to the above disclosed forms. Various modifications and variations can be made with reference to the above descriptions. For example, it is possible to dispose only one of the first switching elements 12 and 18.

DESCRIPTIONS OF REFERENCE NUMERALS 5 wire electrode
6 work piece
7 machining gap
10 main power supply circuit
11 first DC power supply
12, 18 first switching element
13 detection resistor
14 detection resistor
15 low inductance line
16, 24 reverse flow blocking diode
20 auxiliary power supply circuit
21 second DC power supply
22 second switching element
23 current limiting resistor
25 polarity switching circuit
40 pulse generator
42 digital comparator
46 differential amplifier
47 peak holding circuit
48 digital comparator
100 control device

What is claimed is:

1. A power supply device for wire electric discharge machining, comprising:
   a first DC power supply;
   a first switching element disposed between the first DC power supply and a machining gap;
   a second DC power supply;
   a second switching element disposed between the second DC power supply and the machining gap;
   an electric discharge generation detector generating a detection signal indicating that an electric discharge is generated in the machining gap;
   current pulses supplied to the machining gap;
   a peak holding circuit maintaining a peak of the current pulses supplied to the machining gap;
   a comparator connected to the peak holding circuit and comparing the peak of the current pulses with a reference current, and generating a reference signal when the current pulses do not reach the reference current;
   a control device with a memory device storing a machining condition including setting an OFF time during which both of the first switching element and the second switching element is kept off to restore a resistance of the machining gap, and a frequency; and
   a pulse generator connecting to the electric discharge generation detector, the comparator and the control device and controlling the first switching element and the second switching element,
   wherein the pulse generator switches on the second switching element and applies a voltage of the second DC power supply to the machining gap in order to generate the electric discharge in the machining gap in a state when the first switching element is turned off, and
   after the detection signal is generated, the pulse generator intermittently switches on the first switching element at the frequency that has been set by the control device with a pause width which is shorter than the set OFF time in response to the detection signal and supplies a series of the current pulses to the machining gap, and discontinues supply of the series of the current pulses, and
   in response to the reference signal, the pulse generator starts the OFF time when at least one of the current pulses does not reach the reference current,
   wherein the pause width is a time interval from a moment the first switching element being turned off to a moment the first switching element being turned on within a time interval from a moment the detection signal being generated to a moment the OFF time starts.

2. The power supply device for wire electric discharge machining according to claim 1, wherein a circuit where a current flows from the first DC power supply to the machining gap through the first switching element does not comprise a current limiting resistor.

3. The power supply device for wire electric discharge machining according to claim 1, wherein the frequency is 1 MHz or more.

4. The power supply device for wire electric discharge machining according to claim 1, wherein the second DC power supply is connected in parallel to the first DC power supply.

5. The power supply device for wire electric discharge machining according to claim 1, wherein the control device sets a pulse width of the current pulses, and
   the pulse width of the current pulses is shorter than a period, which is a reciprocal of the frequency.

6. The power supply device for wire electric discharge machining according to claim 5, wherein the pause width is longer than a half of the pulse width of the current pluses.

7. The power supply device for wire electric discharge machining according to claim 1 wherein the pause width is a difference between a period, which is a reciprocal of the frequency, and a predetermined time from a moment the first switching element being turned on to a moment the first switching element being turned off.

8. The power supply device for wire electric discharge machining according to claim 1, wherein the control device sets a pulse width of the current pulses, and
   a predetermined time from a moment the first switching element being turned on to a moment the first switching element being turned off is a half of the pulse width of the current pulses.

9. The power supply device for wire electric discharge machining according to claim 1, wherein the pulse generator turns the second switching element off at a timing when initially turns the first switching element off after the detection signal is generated.

* * * * *